R. R. SHAFFER.
STOCK FOUNTAIN.
APPLICATION FILED MAY 28, 1918.
1,307,521.
Patented June 24, 1919.
2 SHEETS—SHEET 1.
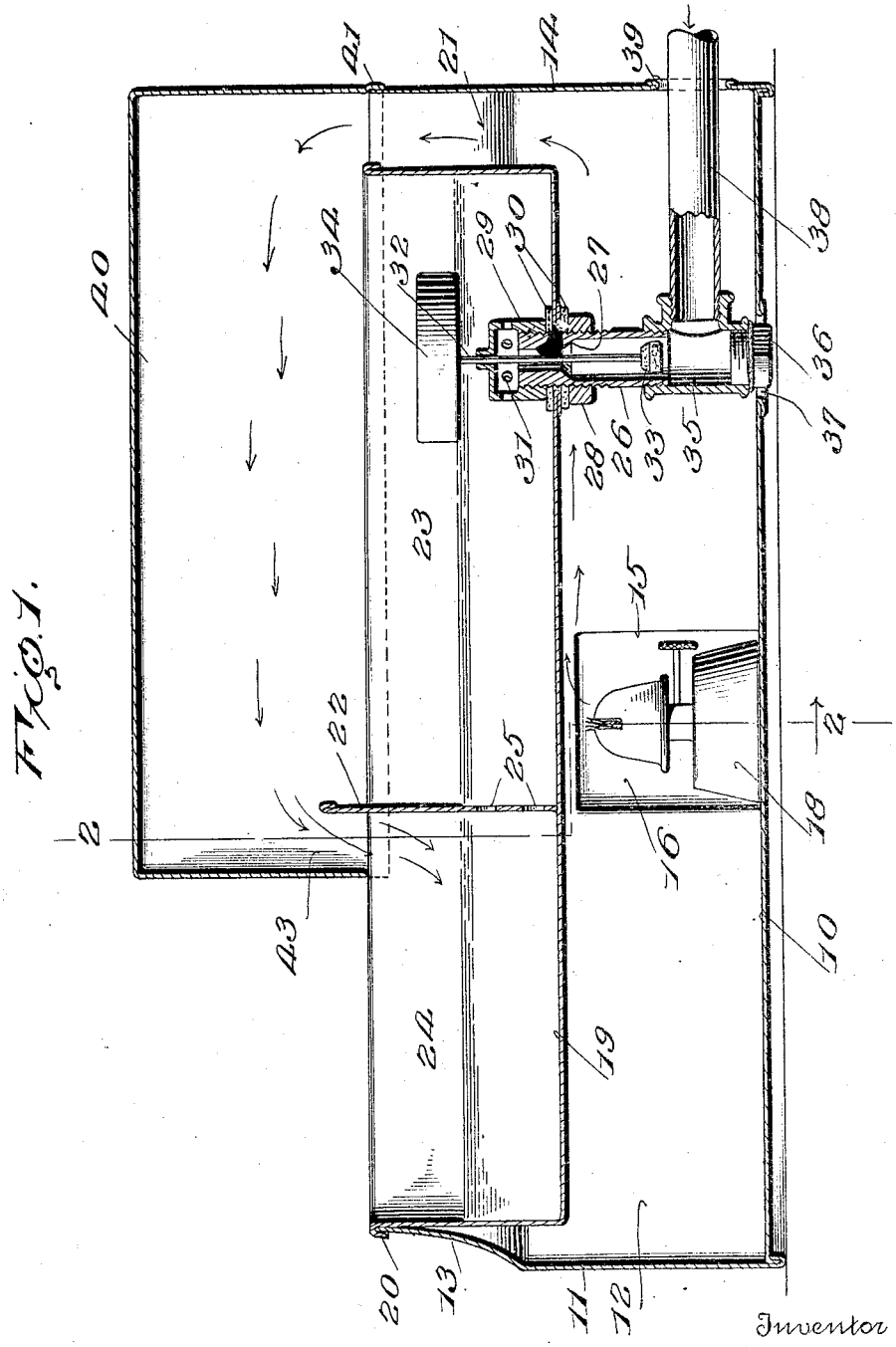
Inventor
R. R. Shaffer
By
Lacey & Lacey, Attorneys

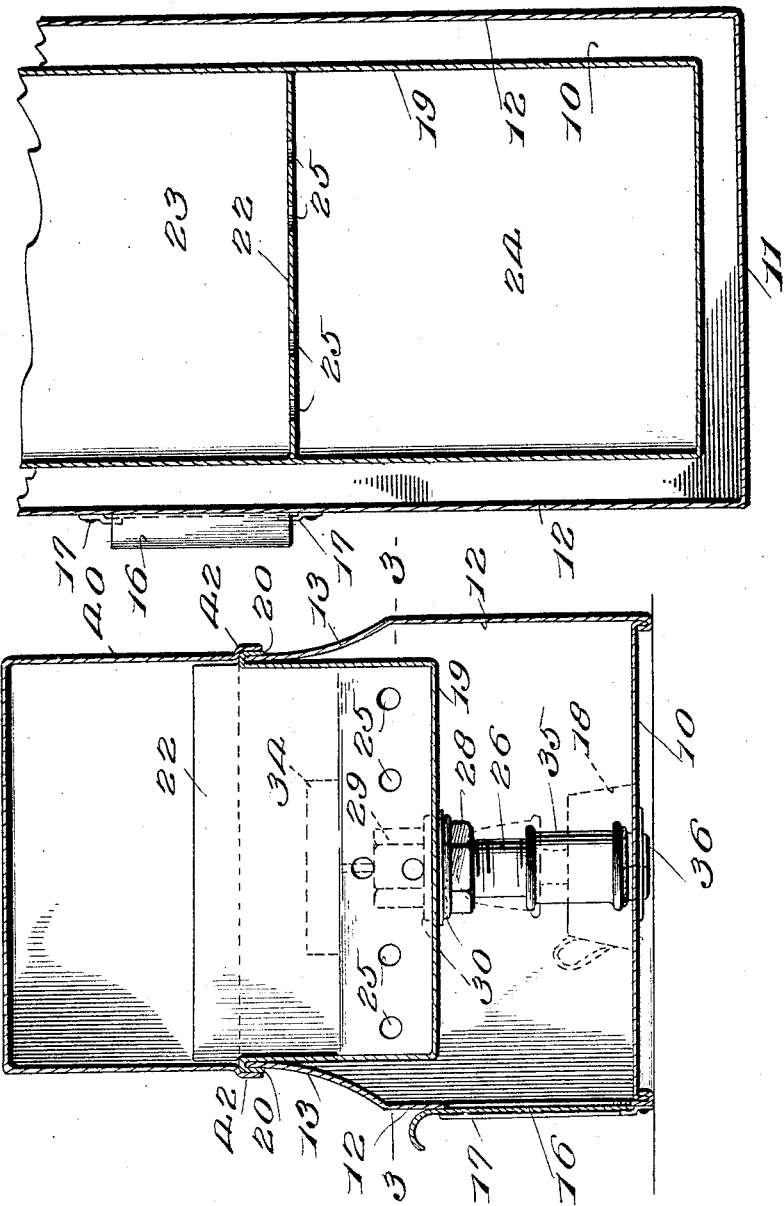

UNITED STATES PATENT OFFICE.

ROBERT R. SHAFFER, OF CRAWFORDSVILLE, IOWA.

STOCK-FOUNTAIN.

1,307,521.    Specification of Letters Patent.    Patented June 24, 1919.

Application filed May 28, 1918. Serial No. 236,997.

*To all whom it may concern:*

Be it known that I, ROBERT R. SHAFFER, citizen of the United States, residing at Crawfordsville, in the county of Washington and State of Iowa, have invented certain new and useful Improvements in Stock-Fountains, of which the following is a specification.

This invention relates to an improved drinking fountain, being more particularly designed for watering hogs or other live stock and has as its primary object to provide a device of this character so constructed that the water in the drinking pan of the fountain will be prevented from freezing.

The invention has as a further object to provide a construction wherein heated air will be caused to circulate around the bottom and sides of the drinking pan and wherein a hood will be employed to fit over the major portion of the pan for directing the heated currents against the surface of the water exposed in the pan to thus effectually prevent freezing of the water in that portion of the pan from which the live stock drink.

The invention has as a further object to so construct the fountain that a constant circulation of heated currents will be maintained beneath the drinking pan to be directed over the pan and discharged against the exposed surface of the water therein.

And the invention has as a still further object to provide an arrangement wherein the flow of water into the drinking pan will be automatically controlled.

Other and incidental objects will appear as the description proceeds. In the drawings wherein I have illustrated the preferred embodiment of the invention, and wherein similar reference characters designate corresponding parts throughout the several views:

Figure 1 is a central longitudinal sectional view of my improved fountain,

Fig. 2 is a vertical sectional view taken on the line 2—2 of Fig. 1 and looking in the direction of the arrows, this view particularly showing the mounting of the drinking pan within the shell of the fountain, and Fig. 3 is a fragmentary longitudinal sectional view taken on the line 3—3 of Fig. 2.

In carrying out the invention my improved fountain is formed with a preferably oblong shell or body 10, the front wall 11 and side walls 12 of which are contracted at their upper margins as shown at 13. The rear wall 14 of the shell is straight. Formed through one of the side walls, at a point substantially midway of the ends of the shell is a door opening 15 normally closed by a suitable door 16 slidable vertically within flanges 17 riveted or otherwise secured to the said side wall at opposite sides of the door opening. Removably fitted within the shell through this door opening is a lamp, as conventionally shown at 18, or other approved type of heating unit.

Removably fitting within the upper end of the shell is a drinking pan 19. The side walls and the front wall of this pan are, as particularly shown in Figs. 1 and 2 of the drawings, formed with outwardly turned flanges 20 respectively engaging over the upper edges of the side and front walls of the shell and suspending the drinking pan within the shell. The pan will thus be supported above the heating lamp 18 and, as clearly brought out in Fig. 1, the pan is somewhat shorter than the shell so that a flue passage or heated air passage 21 is thus defined between the rear end of the pan and the rear end wall 14 of the shell. Extending transversely of the pan adjacent its forward extremity is a vertical partition 22 which projects somewhat above the upper edges of the pan. This partition divides the pan into an inlet compartment 23 and a drinking compartment 24 and formed through the said partition to establish communication between these compartments is a plurality of suitable openings 25.

Fitted through the bottom wall of the drinking pan medially thereof and adjacent the rear end of the said pan, is a pipe 26 which adjacent its upper end, is formed with a valve seat 27. Threaded upon the lower extremity of this pipe is a clamping nut 28, and threaded upon the upper end of the pipe within the drinking pan is a cap 29. Suitable gaskets 30 are interposed between the nut, the cap and the bottom wall of the pan and as will now be clear, the cap and nut may be adjusted for tightly clamping these gaskets against the said wall and providing a sealed joint between the pipe and the pan. Above the upper end of the pipe, the cap 29 is formed with a series of circumferentially spaced discharge openings 31 and slidable through the cap axially of the pipe is a valve stem 32 upon the lower end of which is mounted a valve 33 of approved character adapted to engage the valve seat 27. Mounted upon the upper end of the said valve stem is a preferably hollow metal float 34. Threaded upon the lower end of the pipe 26 is a T-coupling 35 in the bottom outlet of which is removably fitted a plug 36 freely received within a suitable opening 37 in the bottom wall of the shell 10. Threaded into the side outlet of the said T-coupling is a supply pipe 38 which is received through a suitable opening 39 in the rear end wall of the shell. The pipe 38 is connected with any suitable source of water supply so that as long as the valve 33 remains open, water may flow in through this pipe and through the pipe 36 to emerge into the inlet compartment 23 of the drinking pan through the discharge openings 31 of the cap 29. However, as the level of the water in the said pan rises, the float 34 will be lifted and shift the valve to engage its seat 27 for thus automatically cutting off the supply of water to the drinking fountain. This construction provides an arrangement whereby the level of the water in the said pan will be maintained relatively constant. The water upon entering the inlet compartment 23 of the pan will, of course, flow through the openings 25 of the partition 22, to stand within the drinking compartment 24 of the pan. In this connection particular attention is directed to the fact that the partition will prevent entrance of foreign matter from the drinking compartment into the inlet compartment to cause the possible clogging of the valve or interference with its proper operation. In any instance where the fountain is connected directly with a supply tank, the pipe 38 is, as shown in Fig. 1, led through the opening 39 of the shell. However, should it be desired to make an underground connection with the fountain, this pipe is led through the opening 37 in the bottom wall of the shell and connected with the bottom outlet of the T-coupling 35 and the plug 36 then employed for closing the side outlet of the said coupling.

Removably fitted over the rear portion of the shell is a hood 40. The rear end wall of this hood is provided with a flange 41 fitting over the upper edge of the rear end wall 14 of the shell while the side walls of the hood are formed with similar flanges 42 fitting over the flanges 20 upon the side walls of the drinking pan to coöperate with the flange 41 for thus rigidly supporting the hood upon the shell, the forward end wall of the said hood being cut away at its free edge, as particularly shown in Fig. 1, in order to permit the proper seating of the several flanges. The hood 40 is of a length to extend somewhat beyond the partition 22 of the drinking pan, which partition, as will now be observed, projects upwardly into the hood to define a reduced flue passage or heated air passage 43 at the forward end of the hood between the said partition and the front wall of the hood. This heated air passage 43 opens directly into the drinking compartment 24 of the drinking pan.

As will now be clear, the hood 40 will act as a housing for the inlet compartment 23 of the pan, inclosing the valve float 34 to prevent possible interference with the proper operation of the valve by live stock drinking at the fountain. At the same time, the drinking compartment 24 of the drinking pan will be exposed so that such live stock may readily drink therefrom, a fresh supply of water being, as previously explained, maintained in the said compartment by the automatic operation of the inlet valve 33. In cold weather, the lamp 18 is lighted when the space defined within the shell below the drinking pan will provide a combustion chamber for the lamp extending the full length of the pan. Inflowing fresh air to support combustion of the lamp will, of course, enter at the openings 37 and 39 in the shell but, if found advantageous, the door 16 may be left partially open. Leading from the chamber around the sides and front end of the shell are restricted air passages formed by the reduced portions 13 of the shell. These air passages, of course, communicate with the flue passage 21 and owing to the restricted nature of this passage as well as the passage 43 at the forward end of the hood, a relatively strong draft will be maintained from the combustion chamber through the hood to effect a proper burning of the lamp as well as to provide free circulation of heated air currents therefrom. These heated air currents will, therefore, be caused to flow beneath the drinking pan and circulate around the bottom, sides and ends of the pan to prevent undesirable chilling of the body of water in the said pan. Upon entering the hood, the heated currents will be brought directly into contact with the surface of the water contained within the inlet compartment 23 of the pan when the said currents will continue toward the flue passage 43 at the forward end of the hood to flow through this passage and be discharged downwardly directly against the surface of the water exposed in the drinking compartment 24. Such currents will, therefore, be brought directly in contact with the upper strata of water in this compartment to effectually prevent formation of ice upon the surface of the water. I, therefore, provide a fountain adapted to give efficient service at all seasons of the year and which may be used in severe climates without likelihood of freezing of the water in the fountain.

Having thus described the invention, what is claimed as new is:

1. A stock fountain including a shell, a drinking pan supported therein and defining a combustion chamber within the shell having a flue passage leading therefrom, and a hood fitted upon the pan over said flue passage and opening into the pan.

2. A stock fountain including a shell, a drinking pan suspended within and closing the major portion of the upper end of the shell, the said pan defining a combustion chamber within the shell having a flue passage leading therefrom at one end of the pan, and a hood fitting upon the pan over said flue passage and opening into the pan.

3. A stock fountain including a shell having certain of the walls thereof contracted at their upper margins, a drinking pan supported within the shell from the said contracted walls and defining a combustion chamber within the shell having a flue passage leading therefrom at one end of the pan, the contracted portions of said walls defining air passages leading around the sides and opposite end of the shell, and a hood fitting upon the pan over said flue passage and opening into the pan.

4. A stock fountain including a shell, a drinking pan supported therein and defining a combustion chamber within the shell having a flue passage leading therefrom, float actuated means controlling the flow of water into the pan, and a hood fitting upon the pan over said flue passage and housing the said means, the said hood opening into the pan.

5. A stock fountain including a shell, a drinking pan supported therein and defining a combustion chamber within the shell having a flue passage leading therefrom, a partition within the pan defining an inlet compartment and a drinking compartment therein, means for supplying water to the inlet compartment, and a hood fitting upon the pan over said flue passage and coöperating with said partition to define a flue passage opening into the drinking compartment.

6. A stock fountain including a shell, a drinking pan supported therein and defining a combustion chamber within the shell having a flue passage leading therefrom, a partition dividing the pan into an inlet compartment and a drinking compartment and projecting above the pan, means for supplying water to the inlet compartment, and a hood fitting upon the pan over said flue passage and coöperating with the projecting portion of said partition to define a flue passage opening into the drinking compartment.

7. A stock fountain including a shell, a drinking pan supported therein and defining a combustion chamber within the shell having a flue passage leading therefrom, a pipe entering the pan and formed with a valve seat, a valve mounted within said pipe to coöperate with the valve seat, a float disposed within the pan and connected with the valve for automatically closing said valve, a water supply pipe connected with said first mentioned pipe, and a hood fitting upon the pan over said flue passage and opening into the pan.

8. A fountain including a shell providing a heating chamber, a drinking pan, a hood opening into the pan, and means providing communication between the heating chamber of the shell and the hood.

9. A fountain including a shell providing a heating chamber, a drinking pan, a hood opening into the pan, means providing communication between the heating chamber of the shell and the hood, and automatic means controlling discharge of water into the pan.

In testimony whereof I affix my signature.

ROBERT R. SHAFFER. [L. S.]

Copies of this patent may be obtained for five cents each, by addressing the "Commissioner of Patents, Washington, D. C."